(12) United States Patent
Korczyński et al.

(10) Patent No.: US 12,460,739 B2
(45) Date of Patent: Nov. 4, 2025

(54) SERVOVALVE

(71) Applicant: Hamilton Sundstrand Corporation, Charlotte, NC (US)

(72) Inventors: Marcin Korczyński, Wrocław (PL); Adam Mościcki, Stęszów (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 127 days.

(21) Appl. No.: 18/315,164

(22) Filed: May 10, 2023

(65) Prior Publication Data
US 2023/0366482 A1    Nov. 16, 2023

(30) Foreign Application Priority Data
May 12, 2022    (EP) .................................... 22461548

(51) Int. Cl.
*F16K 31/42*    (2006.01)
*F16K 11/22*    (2006.01)
*F16K 31/00*    (2006.01)

(52) U.S. Cl.
CPC ............ *F16K 31/426* (2013.01); *F16K 11/22* (2013.01); *F16K 31/004* (2013.01)

(58) Field of Classification Search
CPC ........... Y10T 137/86879; F16K 31/426; F16K 11/22; F16K 31/004
See application file for complete search history.

(56) References Cited

U.S. PATENT DOCUMENTS 4,046,061 A    9/1977   Stokes
4,877,058 A *  10/1989  Stoll ................... F16K 31/1268
                                                    137/625.48
(Continued)

FOREIGN PATENT DOCUMENTS

DE    4431600 A1    3/1996
EP    3660368 A1    6/2020
(Continued)

OTHER PUBLICATIONS

"JPS6117705A.pdf", Machine Translation of JP 61-17705; Jan. 25, 1986; all pages pertinent (Year: 1986).*

(Continued)

*Primary Examiner* — Michael R Reid
(74) *Attorney, Agent, or Firm* — CANTOR COLBURN LLP

(57) ABSTRACT

A servo valve comprising: a fluid transfer valve assembly includes: a housing having channel therethrough fluidly connecting a supply port, a return port and a control port formed in the housing; a moveable valve spool located within the channel and arranged to regulate flow of fluid between the supply port, the return port and the control port in response to a control signal; and a drive assembly configured to axially move the valve spool relative to the fluid transfer assembly in response to the control signal to regulate the fluid flow. The valve spool comprises a first spool part and a second spool part and the drive assembly comprises a piezoelectric actuator positioned between the first and the second spool parts within the channel. Then when a control signal is applied to the piezoelectric actuator it causes extension or contraction of the first and second piezoelectric actuator elements.

9 Claims, 5 Drawing Sheets

(56) References Cited

U.S. PATENT DOCUMENTS

| | | | | |
|---|---|---|---|---|
| 6,024,340 | A * | 2/2000 | Lazarus | F16K 31/004 310/365 |
| 6,065,688 | A * | 5/2000 | Wilson | F16K 31/004 239/99 |
| 6,086,041 | A * | 7/2000 | Gattuso | F16K 31/004 137/884 |
| 6,786,238 | B2 | 9/2004 | Frisch | |
| 7,251,925 | B2 * | 8/2007 | Paradise | F02C 7/228 60/734 |
| 8,082,952 | B2 * | 12/2011 | Veilleux | F16K 11/0716 137/625.68 |
| 9,309,900 | B2 | 4/2016 | Kopp | |
| 10,767,778 | B2 | 9/2020 | Jaskiewicz | |
| 10,954,971 | B2 | 3/2021 | Jaskiewicz et al. | |
| 11,047,403 | B2 | 6/2021 | Jaskiewicz et al. | |
| 11,111,934 | B2 | 9/2021 | Bujewicz et al. | |
| 2007/0075286 | A1 | 4/2007 | Tanner | |
| 2009/0114286 | A1 * | 5/2009 | DuPuis | F16K 31/004 251/129.01 |
| 2012/0186657 | A1 * | 7/2012 | Rosenthal | F16K 31/004 251/129.01 |
| 2015/0047729 | A1 | 2/2015 | Kopp et al. | |
| 2017/0232563 | A1 * | 8/2017 | Sawicki | F16K 31/12 29/446 |
| 2017/0241449 | A1 * | 8/2017 | Wiktorko | F15B 13/0436 |
| 2020/0023385 | A1 * | 1/2020 | Korczynski | F16K 27/029 |
| 2020/0096018 | A1 * | 3/2020 | Jaskiewicz | F15B 13/0438 |
| 2020/0166152 | A1 * | 5/2020 | Korczynski | F15B 13/0435 |
| 2020/0166153 | A1 * | 5/2020 | Korczynski | F15B 13/02 |
| 2020/0309163 | A1 * | 10/2020 | Bujewicz | F15B 13/0438 |
| 2021/0332905 | A1 | 10/2021 | Jaskiewicz et al. | |

FOREIGN PATENT DOCUMENTS

| | | |
|---|---|---|
| GB | 2104249 A | 3/1983 |
| JP | S6117705 A | 1/1986 |
| JP | S62113975 A | 5/1987 |

OTHER PUBLICATIONS

"JPS62113975A.pdf", Machine Translation of JP 62-113975; May 25, 1987; all pages pertinent (Year: 1987).*

Machine translation of JPS6117705A (Year: 1986).*

Abstract for DE4431600 (A1), Published: Mar. 7, 1996, 1 page.

Abstract for JPS62113975 (A), Published: May 25, 1987, 1 page.

Abstract of JPS6117705 (A), Published: Jan. 25, 1986, 1 page.

European Search Report for Application No. 22461548.4, mailed Oct. 7, 2022, 8 pages.

* cited by examiner

SERVOVALVE

CROSS-REFERENCE TO RELATED APPLICATIONS

This application claims priority to European Patent Application No. 22461548.4 filed May 12, 2022, the entire contents of which is incorporated herein by reference.

TECHNICAL FIELD

The present disclosure relates to servo valves used to transfer quantities of, or manage the flow of fluid e.g. air.

BACKGROUND

Servo valves find a wide range of applications for controlling air or other fluid flow to effect driving or control of another part e.g. an actuator.

A servo valve assembly includes a motor controlled by a control current which controls flow to an air valve to control an actuator. Generally, a servo valve transforms an input control signal into movement of an actuator cylinder. The actuator controls e.g. an air valve. In other words, a servo valve acts as a controller, which commands the actuator, which changes the position of an air valve's (e.g. a so-called butterfly valve's) flow modulating feature.

Such mechanisms are used, for example, in various parts of aircraft where the management of air/fluid flow is required, such as in engine bleeding systems, anti-ice systems, air conditioning systems and cabin pressure systems. Servo valves are widely used to control the flow and pressure of pneumatic and hydraulic fluids to an actuator, and in applications where accurate position or flow rate control is required.

Conventionally, servo valve systems operate by obtaining pressurised fluid from a high pressure source which is transmitted through a load from which the fluid is output as a control fluid. Various types of servo valves are known— see e.g. GB 2104249, US 2015/0047729 and U.S. Pat. No. 9,309,900. DE 4431600 also describes a servo valve assembly.

Electrohydraulic servo valves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve. Movement of the second stage determines the flow of fluid between different combinations of a supply port, a return port and a control port.

Particularly in aircraft applications, but also in other applications, servo valves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servo valves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servo valves provide an alternative to 'flapper'—type servo valves. Jet pipe servo valves are usually larger than flapper type servo valves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

As mentioned above, jet pipe servo valves are advantageous in that they are less sensitive to contamination e.g. in the supply fluid or from the valve environment. These valves are, however, more complex and bulkier. The torque motor that comprises electromagnets to apply electromagnetic force to an armature to move the jet pipe is large and heavy, which adds to the size, weight and complexity of the overall system. Both jet pipe and flapper type valves have a relatively large envelope because of the need to provide the jet pipe/flapper and the drive stage in addition to the spool part of the system. These assemblies have a large number of complex and expensive parts that must be manufactured and assembled to tight tolerances and using soldered fittings. The drive stage of the assembly also requires precise air gaps to be cut between the permanent magnet and the armature plate. Because of the need to design the jet pipe or flapper to extend from the drive stage into the spool, it is not possible for the entire valve to be hermetically sealed which can result in leakage and also allow dirt to get inside the valve.

Conventional flapper-type systems are fairly large, bulky systems with a complex construction of several moving parts and channels, which means that there are several potential points of failure. The individual parts and orifices all need to be very precisely manufactured and then assembled into a valve assembly and calibrated to ensure proper and precise operation of the servo valve. The flapper is usually part of a torque motor, which is a separate sub-assembly and so this needs to be properly calibrated to the spool sub-assembly. Any slight imperfection in the geometry of any of the parts can result in faulty operation of the assembly. Such precise manufacturing and calibration is complex and time consuming. In addition, it is essential that no leakage occurs in the fluid circuit and so proper sealing needs to be ensured by use of seals, O-rings, brazing or the like.

There is a need for a servo valve arrangement that can handle large fluid flows effectively, whilst retaining a light, simple and compact design that also allows for hermetically sealing the assembly.

SUMMARY

According to the disclosure, there is provided a servo valve. The servo valve includes: a fluid transfer valve assembly comprising a housing having channel therethrough fluidly connecting a supply port, a return port and a control port formed in the housing; and a moveable valve spool located within the channel and arranged to regulate flow of fluid between the supply port, the return port and the control port in response to a control signal; and a drive assembly configured to axially move the valve spool relative to the fluid transfer assembly in response to the control signal to regulate the fluid flow. The valve spool comprises a first spool part and a second spool part and the drive assembly comprises a piezoelectric actuator positioned between the first and the second spool parts within the channel. The piezoelectric actuator comprises a first piezoelectric actuator element having a first end around which the first spool part is mounted and a second piezoelectric actuator element having a first end around which the second spool part is mounted, and each of the first and the second piezoelectric actuator elements having a second end, the second ends of the first and second piezoelectric actuator elements being connected to each other. The control signal is applied to the piezoelectric actuator to cause extension or contraction of the first and second piezoelectric actuator elements according to the polarity of the signal applied to each of the elements, and to thus cause corresponding movement of the respective spool parts. The drive assembly comprises a first nozzle fluidly connecting the supply port and the housing channel, and a second nozzle fluidly connecting the return port and the housing channel, wherein expansion and contraction of the first and second piezoelectric actuator elements causes axial movement of the respective first and second spool parts relative to the first and second nozzles so as to cover or expose the respective nozzles.

Optional features are defined in the dependent claims attached hereto.

BRIEF DESCRIPTION OF THE DRAWINGS

Examples of a servo valve assembly will now be described with reference to the drawings. It should be noted that these are examples only, and variations are possible within the scope of the claims.

DETAILED DESCRIPTION

A servo valve as described below can, for example, be used in an actuator control system. The servo valve is controlled by a torque motor to control a control flow of fluid that is output via e.g. a butterfly value to control the movement of an actuator.

Figure 1:
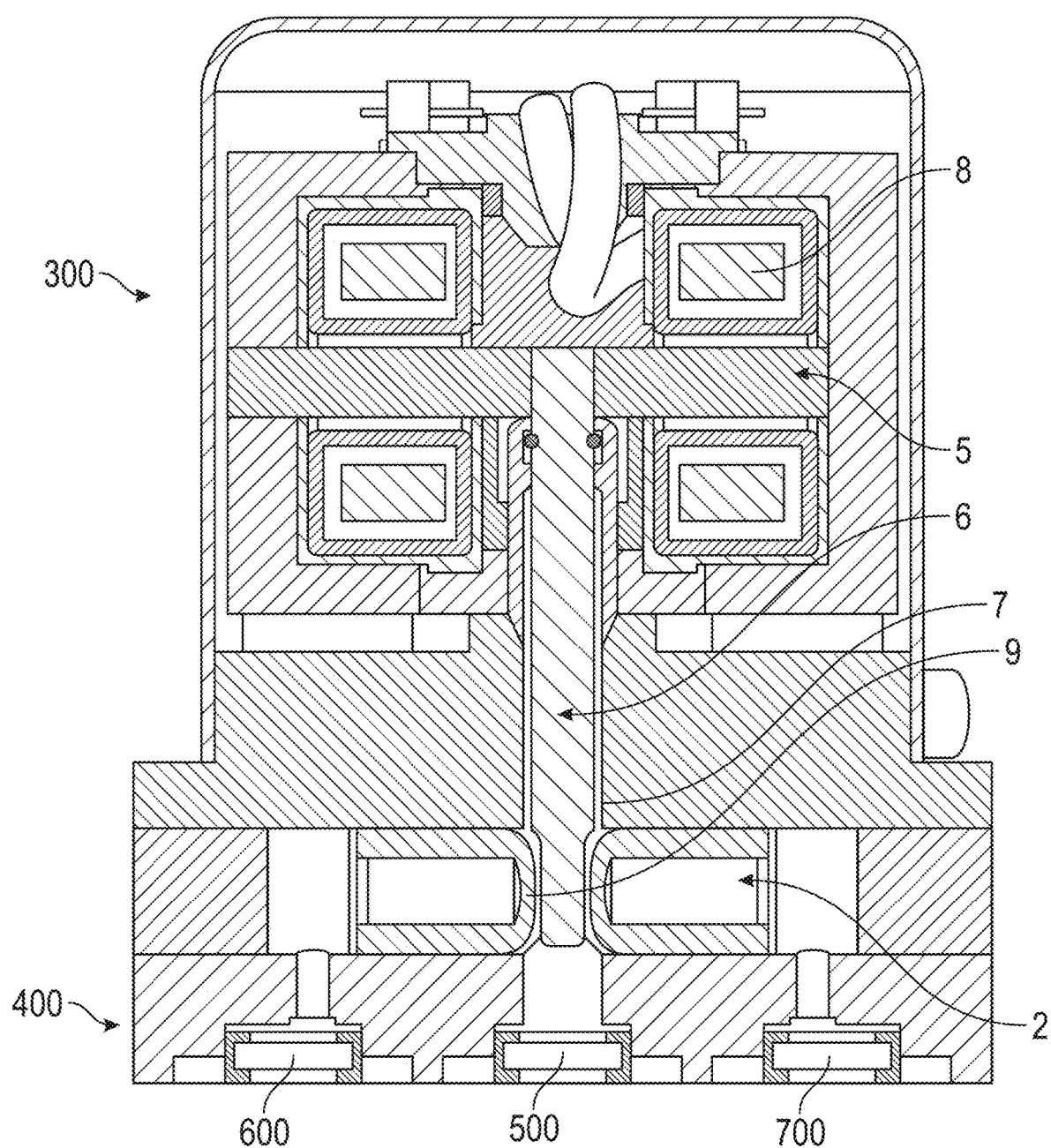
FIG. 1 is a sectional view of a conventional flapper-type servo valve.
Figure 2:
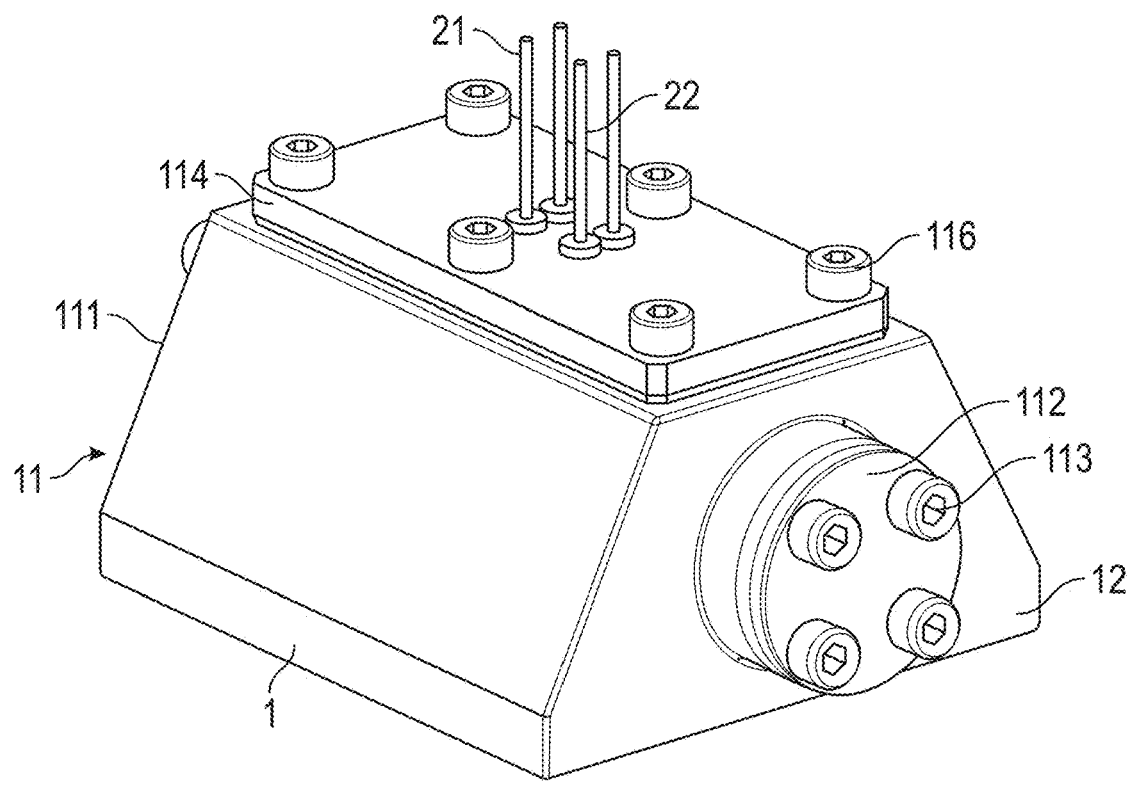
FIG. 2 is a perspective view of a servo valve according to the disclosure.
Figure 3:
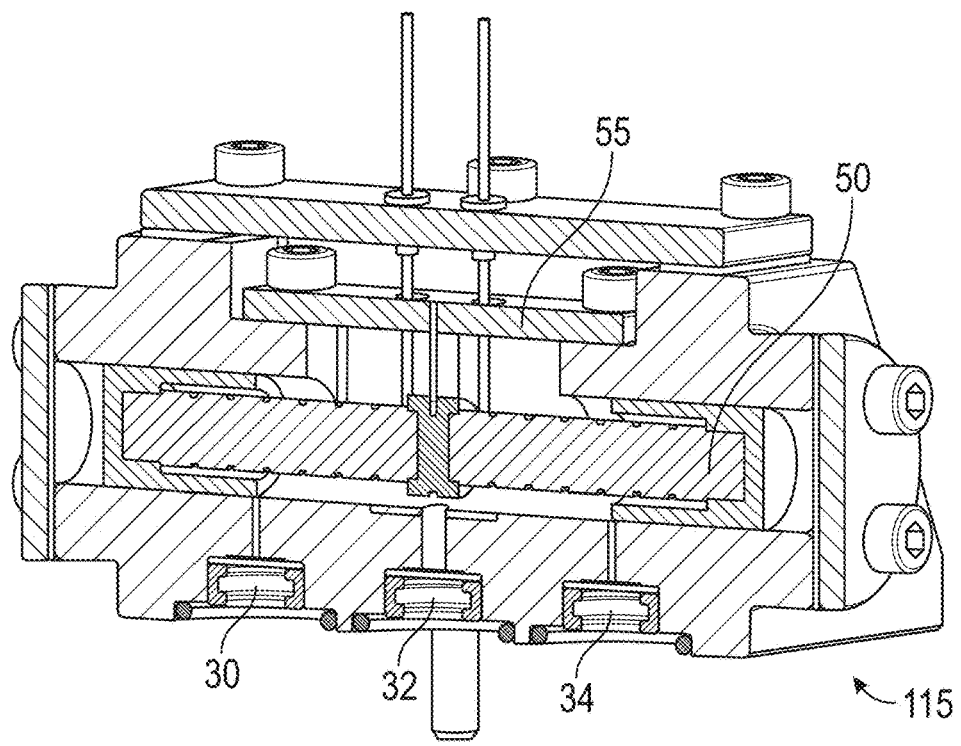
FIG. 3 is a cut away view of a servo valve as shown in FIG. 2.
Figure 4A:
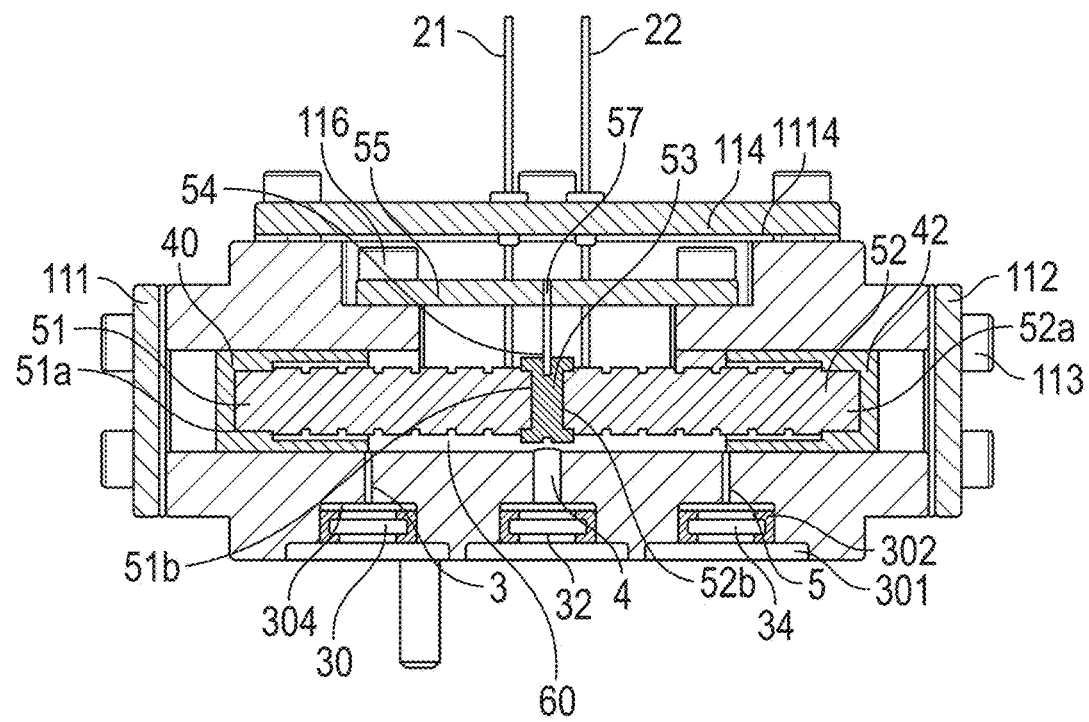
FIG. 4A is a simplified sectional view of a servo valve such as shown in FIG. 2 and FIG. 3.
Figure 4B:
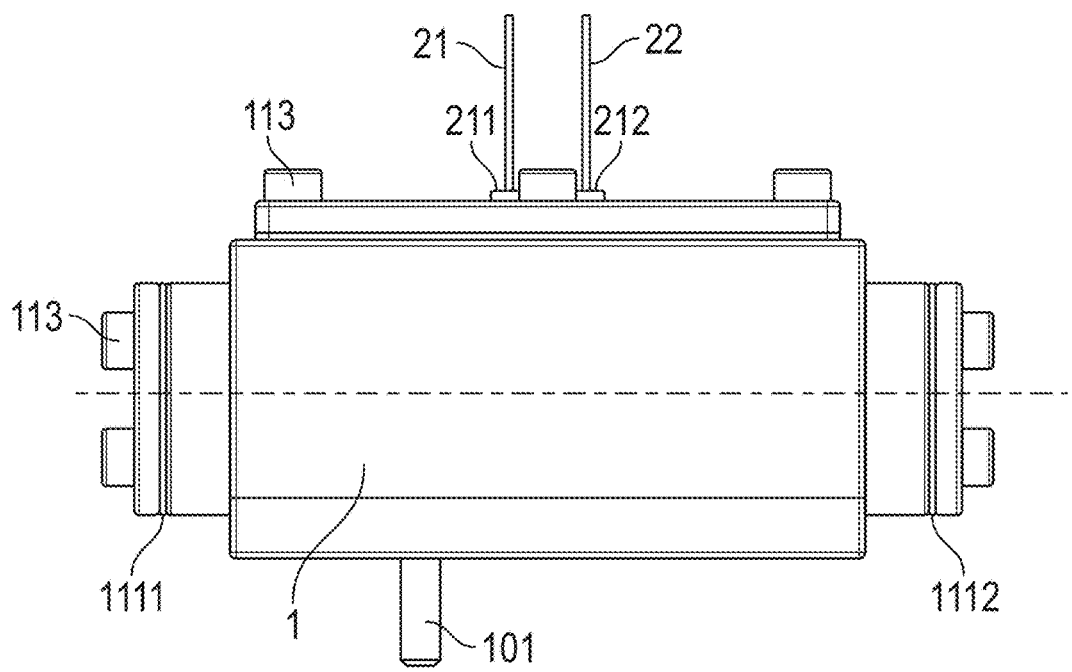
FIG. 4B is a view of the reverse side of FIG. 4A.
Figure 5:
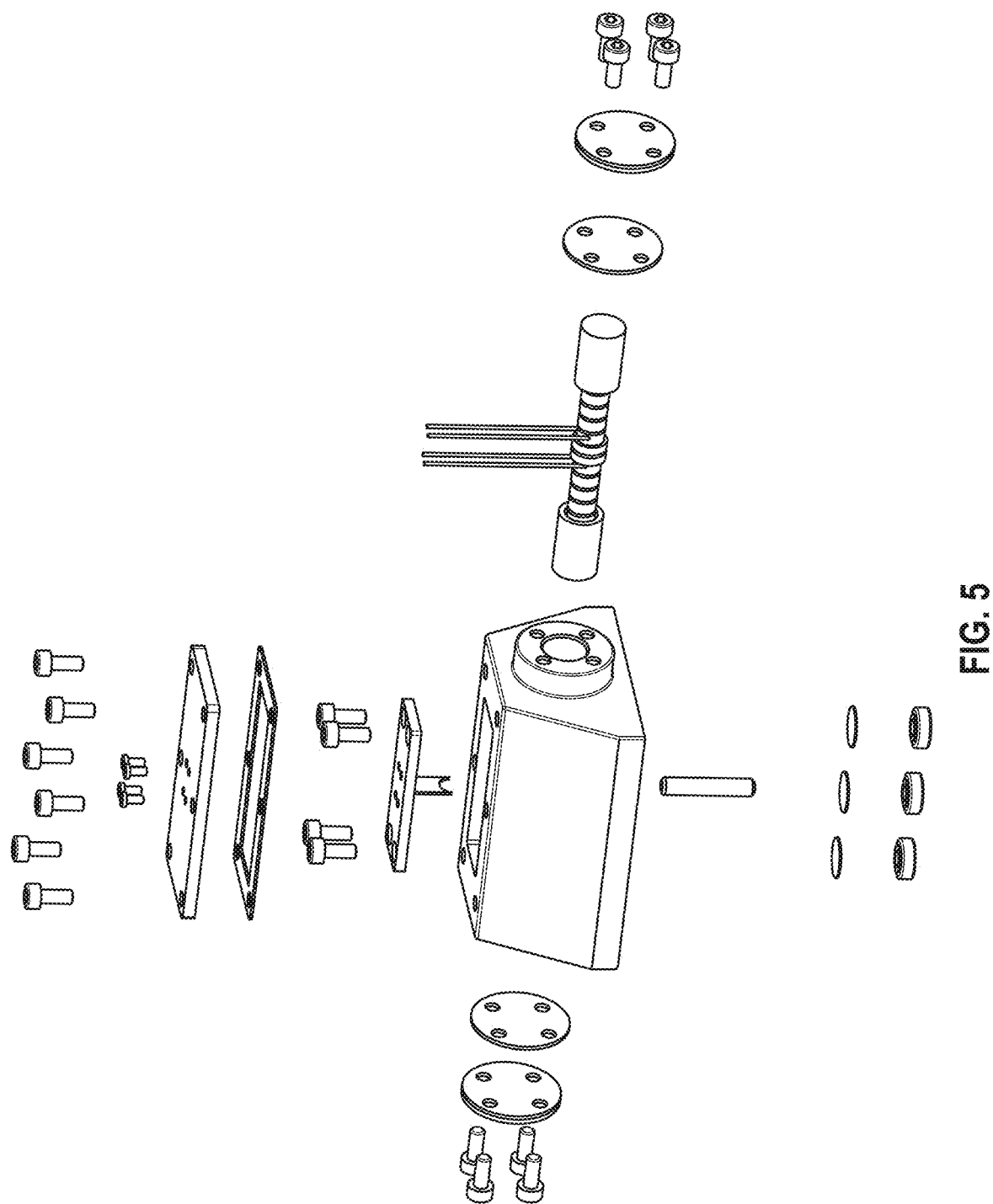
FIG. 5 is an exploded view of a servo valve such as shown in FIGS. 2 and 3.
Figure 6:
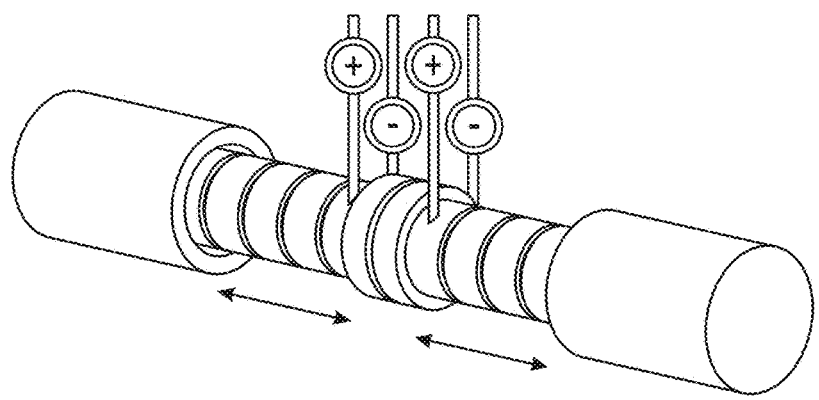
FIG. 6 shows a spool actuator of a servo valve according to the disclosure.
Figure 7:
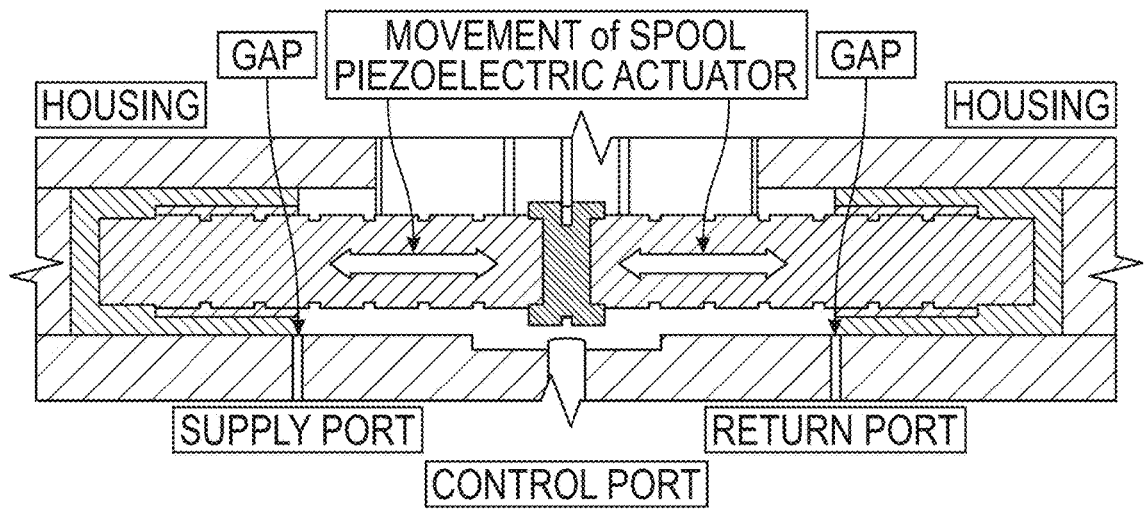
FIG. 7 is provided for explaining operation of a servo valve according to the disclosure.
Figure 8:
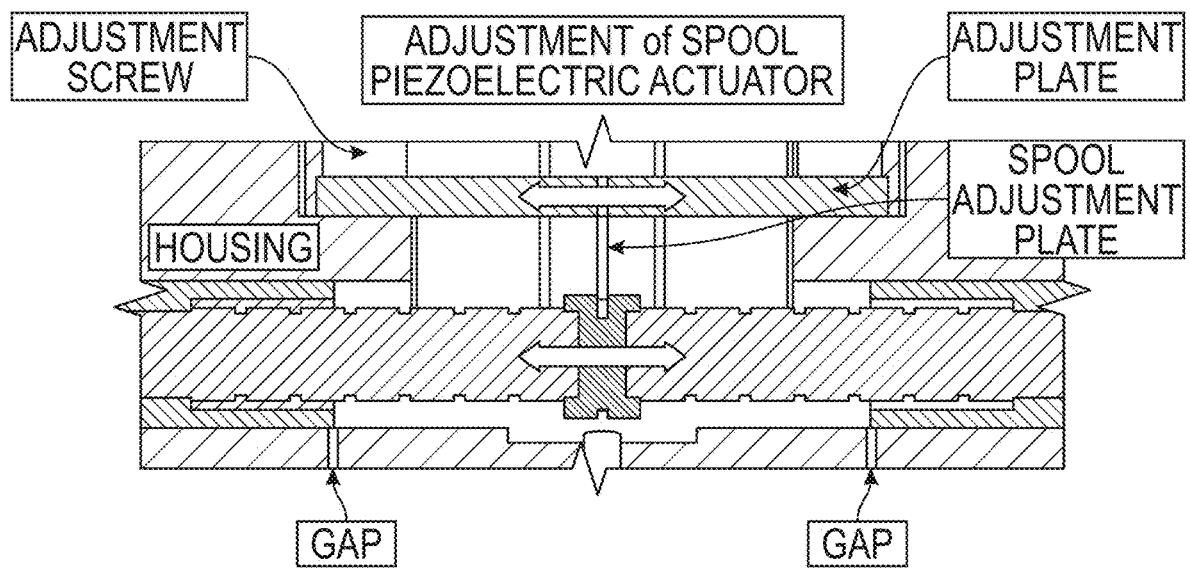
FIG. 8 is provided for explaining calibration of a servo valve according to the disclosure.

FIG. 1 shows generally a known arrangement of a flapper and nozzle servo valve. The assembly comprises a torque motor subsystem 300 and a flapper-nozzle subsystem 400. In more detail, the assembly comprises a flapper 6 disposed in a flapper cavity 7, a pair of nozzles 9 disposed in a nozzle housing, and an electromagnet 8 surrounding an armature 5. The armature has opposed tips, which protrude through gaps in a housing surrounding the electromagnet, and which are arranged to leave spaces between the armature and the housing.

The electromagnet is connected to an electrical input (not shown) and the armature 5 is connected in a perpendicular manner to the flapper 6, or is an integral part of the flapper—the integral part being perpendicular to the flapper. The electromagnet includes coils that surround the armature and a set of permanent magnets that surround the coils. When a current is applied to the coils from the electrical input, magnetic flux acting on the ends of the armature is developed. The direction of the magnetic flux (force) depends on the sign (direction) of the current. The magnetic flux will cause the armature tips to be attracted to the electromagnet (current direction determines which magnetic pole is attracting and which one is repelling) thus varying the size of the spaces. This magnetic force creates an applied torque on the flapper, which is proportional to the applied current. The flapper rotates and interacts with the nozzles.

Nozzles 9 are housed within a respective nozzle cavity in the housing, and comprise a fluid outlet and fluid inlet. The housing also has a port, which allows communication of fluid to the nozzles. The flapper comprises a blocking element at an end thereof which interacts with fluid outlets of nozzles to provide metering of fluid from the fluid outlets to a fluid port in the housing. The fluid port in turn allows communication of fluid pressure downstream to a spool valve and actuator arrangement (not shown). The positioning of the flapper between nozzles (controlled by the movement of the armature via electromagnet) will control the amount of fluid pressure communicated to the spool valve and actuator arrangement (not shown), which can be used to control actuator movement.

The flows of pressurised fluid in a conventional flapper type system are as follows. The hydraulic fluid to be regulated by the spool valve for moving the actuator is delivered from a fluid supply with a constant pressure Ps via orifices 10,20. At the orifices, the fluid is divided into two streams. One stream 6,7 is provided to the ends of the valve spool. The other stream is directed to the flapper nozzles 9', 9" where it is used to control movement of the spool due to the position of the flapper 6. Depending on the gap between the flapper and the respective nozzles 9', 9" more or less flow will be possible through each nozzle causing pressure differences in control channels P1 and P2 which results in pressures differences at the ends of the spool causing movement of the spool. Thus, if the flapper 6 is closer to nozzle 9' than nozzle 9", then more flow is possible through nozzle 9" and less through nozzle 9'. If less flow is possible through nozzle 9', more fluid flows to the end of the spool through channel 70 than through channel 60 thus increasing the pressure at end A of the spool compared to end B and thus causing the spool to move in direction X. Conversely, if the flapper is closer to nozzle 9", pressure increases at end B causing the spool to move in direction Y.

Although the flapper and nozzle type of servo valve arrangement shown in FIG. 1 can be effective at controlling an actuator, it has been found that limitations nevertheless exist. For example: in order to provide the correct limitations on flapper and armature movement, the spaces must be manufactured, assembled and calibrated very precisely to very tight tolerances, as must the spacing of the nozzles from the flapper. Moreover, there is also a general desire to reduce servo valve weight and simplify its manufacture, construction and operation, as well as improve the operational pressures and frequencies that may be realised with such servo valve arrangements.

In more detail, both in the conventional flapper or jet-pipe type assemblies, to open the servo valve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle turns or the flapper pivots. The more it turns/pivots, the greater the linear or axial movement of the spool. A torque motor usually consists of coil windings, a ferromagnetic armature, permanent magnets and a mechanical spring (e.g. two torsional bridge shafts). This arrangement provides movement of the nozzle/flapper proportional to the input control current.

According to the present disclosure, the torque motor is replaced by a piezoelectric actuator assembly as will be described further below with reference to FIGS. 2 to 8.

A servo valve according to the disclosure is provided as a compact assembly provided within a housing 1 that has a smaller overall envelope than known servo valves, since the drive stage is combined with, and inside, the fluid flow stage. The actuator spool and drive assembly are mounted within the housing 1 as described further below, and the housing is closed at its ends 11,12 by end caps 111, 112. The end caps 111, 112 are attached by fasteners 113 so that they can be removed to access the valve assembly inside the housing. A top cover 114 is also provided to seal the top of the housing 1. Power conductors e.g. wires 21, 22 extend through the top cover 114 from the exterior to the interior of the housing 1. Ports are provided in the bottom 115 of the housing. The ports include a supply port 30, a control port 32 and a return port 34.

Seals 111, 112 are preferably provided to seal the end caps 111, 112 to the housing, and (114) to seal the top cover 114. An insulative plug 211, 212 may be provided in the top cover 114, through which the power conductors 21, 22 can pass. Seals 301 may also be provided at the ports 30, 32, 34. Each port may also be provided with a screen ring 302 and/or a filter 304 to filter debris. In the example shown, a locating pin 101 may extend from the housing 1 e.g. from the bottom, for accurate location of the assembly.

The drive stage and the fluid transfer stage are combined, as described further below, inside the housing 1.

The fluid transfer stage comprises a spool and a spool piezoelectric actuator 50 located within, preferably fully within, the spool, the spool piezoelectric actuator 50 comprising a first piezoelectric actuator element 51 and a second piezoelectric actuator element 52 each arranged to expand or contract according to electric command signals applied to it respective power conductors 21, 22. The spool comprises first and second spool parts 40, 42, the first spool part 40 provided over a first end 51a of the first piezoelectric actuator element 51 and the second part 42 provided over a first end 52a of the second piezoelectric actuator element 52. The spool parts 40, 42 may be mounted to the ends of the piezoelectric actuator elements in any known manner. One non-limiting example is by means of a shrink fit. The spool piezoelectric actuator 50 and the spool parts 40, 42 mounted to the ends of the two piezoelectric actuator elements 51, 52, are arranged within a channel 60 between the first and second ends of the housing, for axial movement therein, the axis A being defined through the first and second ends. According to the command signal provided to the spool piezoelectric actuator 50, via the power conductors 21, 22, the piezoelectric actuator elements either expand axially towards the ends thus moving the corresponding spool part axially towards the respective end, or contract, thus moving the respective spool part away from the respective end.

Flow channels or nozzles 3, 5 are formed through the housing from the channel 60 to each of the supply port and the return port, respectively, to provide fluid communication between the channel 60 and the respective port. The spool parts 40, 42 are sized and positioned, initially, such that axial movement of the spool parts by extension/contraction of the spool piezoelectric actuator elements 51, 52 determines whether each spool part is positioned across its respective nozzle, to block flow between the channel and the respective port, or the spool part is not positioned over the nozzle, in which case fluid can flow between the channel 60 and the respective port. Thus, depending on the signal, more precisely the polarity of the signal applied to the spool piezoelectric actuator elements 51, 52, flow is permitted or prevented between the channel and the supply port/the channel and the return port. A flow channel 4 is also provided through the housing between the channel 60 and the control port 32.

Fluid is provided to the servo valve to the supply port 30 and flows through the channel 60 to the return port 34 and the control port 32. When the valve is positioned such that fluid flows from the supply port to the control port, for example, the valve is positioned to move a connected actuator (not shown) by means of the control fluid from the control port. When the piezoelectric actuator elements 51, 52 are supplied with electricity, as mentioned above, they will expand or contract (according to the polarity of the electricity) causing the connected spool part 40 to either cover or expose the nozzle to the supply port 30 and causing the spool part, 42 to either cover or expose the nozzle to the return port 34 thus determining the flow from the supply port to the control port and the return port. For example, if the nozzle at the supply port is not covered by the first spool element 40—i.e. is open or exposed with respect to the channel 60—pressurised fluid flows into the channel 60 from the supply port 30. If the nozzle at the return port 34 is covered by the second spool part 42, then the fluid flows from the channel to the control port 32. If, however, the supply port nozzle is covered and the return port nozzle is exposed, fluid flows from the control port to the return port. Thus, the position of the spool parts 40, 42—determined by the expansion or contraction of the respective piezoelectric actuator elements 51, 52 responsive to the applied signals—determines the flow with respect to the control port which, in turn, controls the device e.g. actuator, controlled by the control fluid from the control port.

In this way, the spool parts 40, 42 are a sliding part of the spool and also perform the function of the conventional flapper for the nozzles formed in the housing by virtue of the expansion contraction of the piezoelectric actuator elements 51, 52 on which the spool parts are mounted.

The second end 51b of the first piezoelectric actuator element 51 is connected to the second end 52b of the second piezoelectric actuator element 52 inside the housing channel 60 by a connector element 53. The ends 51b, 52b may, as one example, be connected using a thermal connection technique, which is fast and effective, but other means of connecting the ends may also be used. In order to calibrate the piezoelectric actuator elements initially, the connection or connector element 53 between the two elements 51, 52 is connected, e.g. via a spool adjustment plate 57 located in a channel 54 through the housing 1, to an adjustment plate 55 which is arranged to keep the spool in its neutral position when no control signal is applied to move the spool. To adjust or calibrate the neutral position, on a test stand/bench, the adjustment plate 55 can be moved to the left or right in the axial direction and then the screws 116 fastening the adjustment plate are tightened when the correct position of the adjustment plate 55 is attained.

Depending on the piezoelectric materials used for the piezoelectric actuator elements, the degree of expansion/contraction will vary and this provides the possibility of having elements of different lengths according to the valve design and use, i.e. depending on the desired overall size of the servo valve, an appropriate material can be selected for the piezoelectric elements.

The system of this disclosure has fewer component parts than conventional systems and the assembly is simpler, lighter and less expensive. The spool and drive stage components are all mounted in a single compact housing which can be properly sealed to prevent leakage and also to prevent dirt entering the assembly. The location of the piezoelectric elements within the spool and the housing also mean that they are less vulnerable to very high and very low ambient temperatures.

Servo valves as described herein are useful e.g. for aircraft and industrial applications requiring single stage servo valves for high air flow.

Although this disclosure has been described in terms of preferred examples, it should be understood that these examples are illustrative only and modifications and alterations are possible within the scope of the claims.

The invention claimed is:

1. A servovalve comprising:
   a fluid transfer valve assembly comprising a housing having channel therethrough fluidly connecting a supply port, a return port and a control port formed in the housing;
   a moveable valve spool located within the channel that regulates flow of fluid between the supply port, the return port and the control port in response to a control signal, wherein the moveable valve spool comprises a first spool part and a second spool part; and
   a drive assembly that moves the valve spool relative to the fluid transfer assembly in response to the control signal to regulate the fluid flow, the drive assembly comprising:
      a piezoelectric actuator positioned between the first and the second spool parts within the channel, the piezoelectric actuator comprising a first piezoelectric actuator element having a first end around which the first spool part is mounted and a second piezoelectric actuator element having a first end around which the second spool part is mounted, and each of the first and the second piezoelectric actuator elements having a second end, the second ends of the first and second piezoelectric actuator elements being connected to each other
      wherein application of the control signal to the piezoelectric actuator causes extension or contraction of the first and second piezoelectric actuator elements according to the polarity of the signal applied to each of the elements and causes corresponding movement of the respective spool parts;
   a first nozzle fluidly connecting the supply port and the channel of the housing; and
   a second nozzle fluidly connecting the return port and the channel of the housing, wherein expansion and contraction of the first and second piezoelectric actuator elements axial moves the respective first and second spool parts relative to the first and second nozzles to cover or expose the respective nozzles;
   wherein the second end of the first piezoelectric actuator element is attached to the second end of the second piezoelectric actuator element by means of a connector element;
   wherein the connector element is connected to an adjustment plate that is configured to can be moved relative to the ends of the housing to establish a neutral position of the spool parts.

2. The servovalve of claim 1, wherein the connector element is attached to the adjustor plate via a spool adjustment plate located in a channel through the housing.

3. A method of controlling fluid flow through a servovalve as claimed in claim 1, the method comprising:
   a control signal to the first and second piezoelectric actuator elements, whereby the polarity of the signal applied to each of the piezoelectric actuator elements determines the contraction or expansion of the piezoelectric actuator element and, thereby, the axial movement of the spool parts in the housing.

4. The servovalve of claim 1, wherein the housing includes:
   a first end closed by a first end cap and a second end closed by a second end cap;
   a top cover located between the first and second ends; and
   a bottom located between the first and second ends on a side of the housing opposite the top cover;
   wherein the supply port, the return port and the control port are formed in the housing from the channel to the bottom of the housing;
   wherein the first and second end caps are removably attached to the housing by fasteners.

5. The servovalve of claim 1, wherein the control signal is applied via a first power conductor electrically connected to the first piezoelectric actuator element through the housing and a second power conductor electrically connected to the second piezoelectric actuator element through the housing.

6. The servovalve of claim 5, wherein each of the first and second power conductor passes through an insulative plug in the housing.

7. The servovalve of claim 4, wherein seals are provided between the end caps and the housing.

8. The servovalve of claim 1, wherein seals are provided at the supply port, return port and control port.

9. The servovalve of claim 1, wherein each of the first and the second spool parts are part is attached to the respective piezoelectric actuator element by shrink fit.

* * * * *